United States Patent [19]

McLaughlin

[11] Patent Number: 4,625,997
[45] Date of Patent: Dec. 2, 1986

[54] WHEELED CARRIAGE FOR SUPPORTING AND TRANSPORTING PIPES

[76] Inventor: Hugh R. McLaughlin, Aberdour, Bray Rd., Foxrock, Dublin 18, Ireland

[21] Appl. No.: 720,324

[22] Filed: Apr. 5, 1985

[30] Foreign Application Priority Data

Apr. 9, 1984 [IE] Ireland .................................. 871/84

[51] Int. Cl.$^4$ ............................................. B05B 15/00
[52] U.S. Cl. ........................................ 285/5; 239/732
[58] Field of Search ............... 239/709, 717, 718, 719, 239/721; 285/5, 6; 34/243 R, 71; 248/75

[56] References Cited

U.S. PATENT DOCUMENTS

| | | | |
|---|---|---|---|
| 288,222 | 11/1883 | Flad ....................................... | 239/719 |
| 664,240 | 12/1900 | Doehring ............................. | 239/718 |
| 2,860,008 | 11/1958 | Jacoby ................................. | 285/5 X |
| 2,889,993 | 6/1959 | Willetts et al. ...................... | 285/5 X |
| 3,057,559 | 10/1962 | Ingram et al. ........................ | 239/719 |
| 4,542,594 | 9/1985 | McLaughlin ........................... | 34/71 |

FOREIGN PATENT DOCUMENTS 140700 4/1920 United Kingdom ................. 239/719

Primary Examiner—Harry Tanner
Attorney, Agent, or Firm—Sughrue, Mion, Zinn, Macpeak & Seas

[57] ABSTRACT

A wheeled carriage comprises a frame member, two independently swivelling ground-engaging wheels mounted spaced apart below the frame member, and at least one pipe support member mounted below the frame member for pivotting about a substantially horizontal axis transverse a notional line joining the swivel axes of the wheels. The pipe support member is adapted to support a pipe between the wheels. The carriages are used to form a pipe train comprising a series of connected pipe sections supported by a plurality of wheeled carriages connected together in pairs by pivotal link bars bridging the frame members of connected pairs of carriages, the pipe sections being flexibly connected together between each connected pair of carriages.

3 Claims, 6 Drawing Figures

WHEELED CARRIAGE FOR SUPPORTING AND TRANSPORTING PIPES

This invention relates to a wheeled carriage for use in supporting and transporting a pipe or series of connected pipes. In particular the invention is related to a wheeled carriage which can form part of a "train" for supporting and transporting a pipe or a series of connected pipes and which in use is trailed behind a moving vehicle for discharging fluid carried by, or collected by and carried by, the moving vehicle, for example an agricultural machine or an apparatus for collecting water from the ground as described in my copending patent application No. 585,083.

In my co-pending patent application No. 585,083 the water collected by the machine is discharged from collection tanks directly as it is collected, using a trailing hose or a spray discharge nozzle which both serve to discharge the water away from the machine and from the area from which the water is being removed. The spray nozzle works very well subject to the limitation that the distance one may spray the water is determined by the pump pressure and in many instances, for example a football field, that distance may be too short for efficient working of the machine. If one uses a trailing hose distance is not a major problem, but a long hose of 1.5 inch diameter, would cause damage to the ground due to the weight of the water in the hose as the hose is trailed behind the machine. Further a machine trailing a long hose finds it impossible to reverse or turn properly in a confined area without manual assistance to move the hose out of the path of the machine.

The present invention is directed primarily to overcoming the disadvantages associated with the use of a long trailed hose by providing means which will support the hose—connected together pipe sections for example—above the ground and also carrying the hose in such manner that the machine may reverse and/or turn freely without the hose causing any problem or impeding the path of the machine.

Accordingly the present invention provides a wheeled carriage comprising a frame member, two independently swivelling ground-engaging wheels mounted spaced apart below the frame member, at least one pipe support member mounted below the frame member for pivoting about a substantially horizontal axis transverse a notional line joining the swivel axes of the wheels, the pipe support member being adapted to support a pipe between the said wheels, and means for pivotally connecting a link bar to the frame member for rotation about a substantially vertical axis to permit the carriage to be coupled to a like carriage to form a connected pair.

The present invention also provides a pipe train comprising a series of connected pipe sections supported by a plurality of wheeled carriages as above, the carriages being connected together in pairs by pivotal link bars bridging the frame members of connected pairs of carriages, and the pipe sections being flexibly connected together between each connected pair of carriages.

Preferably the frame member of each wheeled carriage is provided with stop members which act as limiting stops for each link bar connecting together a pair of wheeled carriages to determine the maximum angular displacement of one wheeled carriage relative to the second wheeled carriage of the pair.

The provision of the swivel wheels on each carriage, the use of flexible pipe sections as pipe coupling means, the use of a pivotally mounted pipe carrier on each wheeled carriage, and the use of a controlled pivotally mounted connecting link bar between each pair of connected wheeled carriages ensures that the pipe train can follow the machine by the bending and the pivotting of the constituent components without damage to the machine and/or the pipe train.

The present invention has particular application as a pipe train in conjunction with the apparatus described in the Specification of my co-pending patent application No. 585,083.

The invention will be understood from the following description of an embodiment thereof given by way of example only with reference to the accompanying drawings in which.

Figure 1:
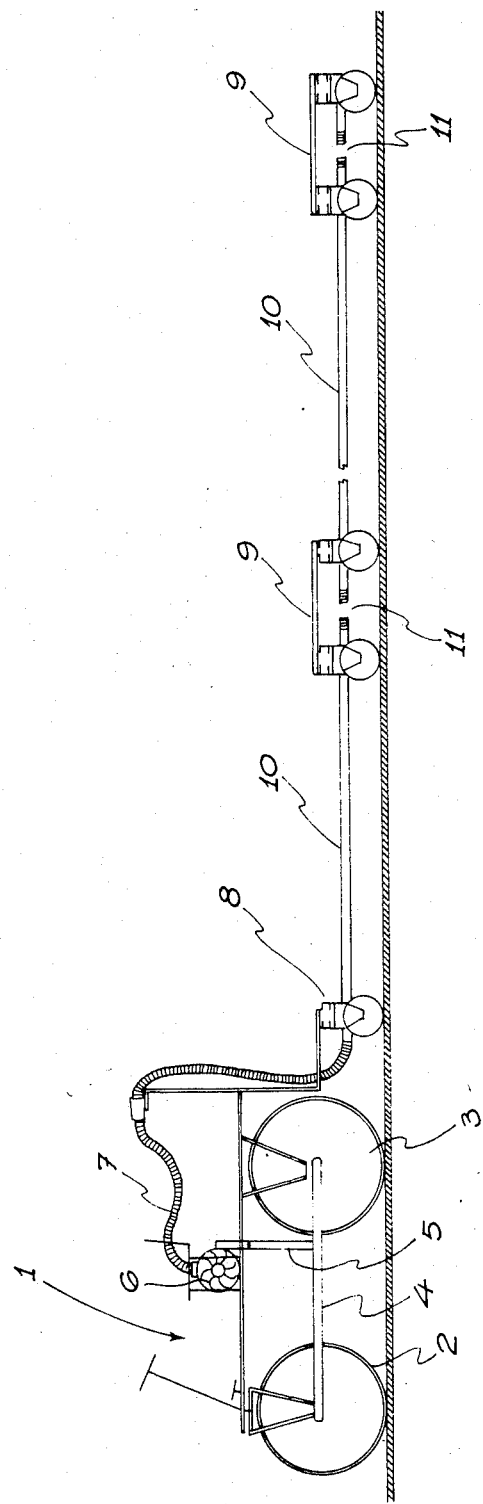
FIG. 1 is a diagrammatic drawing illustrating a pipe train according to the present invention.

FIG. 1 of the accompanying drawings illustrates a pipe train according to the present invention in use with a machine for removing water from the ground as described in the Specification of my co-pending patent application No. 585,083. The machine is indicated generally at 1 and the water collected by the rollers 2 and 3 is pumped from the roller collection tanks through pipes 4 and 5 through a pump 6 to a hose 7. Attached to the rear of the machine 1 is a pipe train comprising a first wheeled carriage 8 followed by connected pairs of wheeled carriages 9. The wheeled carriages 8,9 support and transport rigid PVC pipe sections 10, which are connected together between each pair of wheeled carriages 9 by a releasable flexible pipe coupling 11. The pipe train is trailed behind the machine 1 and the water from the hose 7 passes along the pipe sections 10 to discharge away from the area being drained by the machine 1.

It will be understood that the use of the releasable flexible pipe couplings 11 enables the pipe train to bend and follow the path of the machine 1 behind which it trails.

Figure 2:
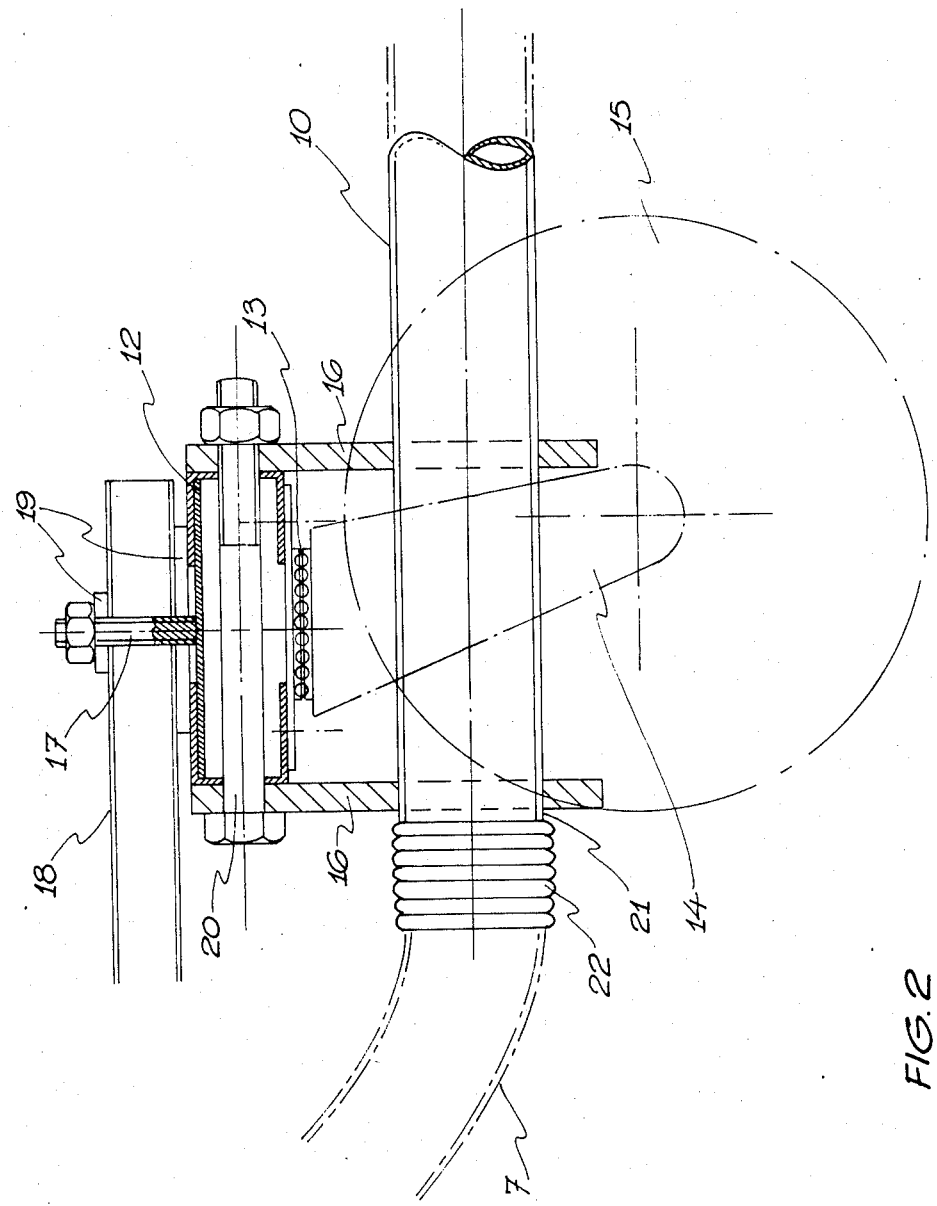
FIG. 2 is a detail sectional view from one side of a wheeled carriage according to the present invention in use as the first wheeled carriage of the pipe train.
Figure 4:
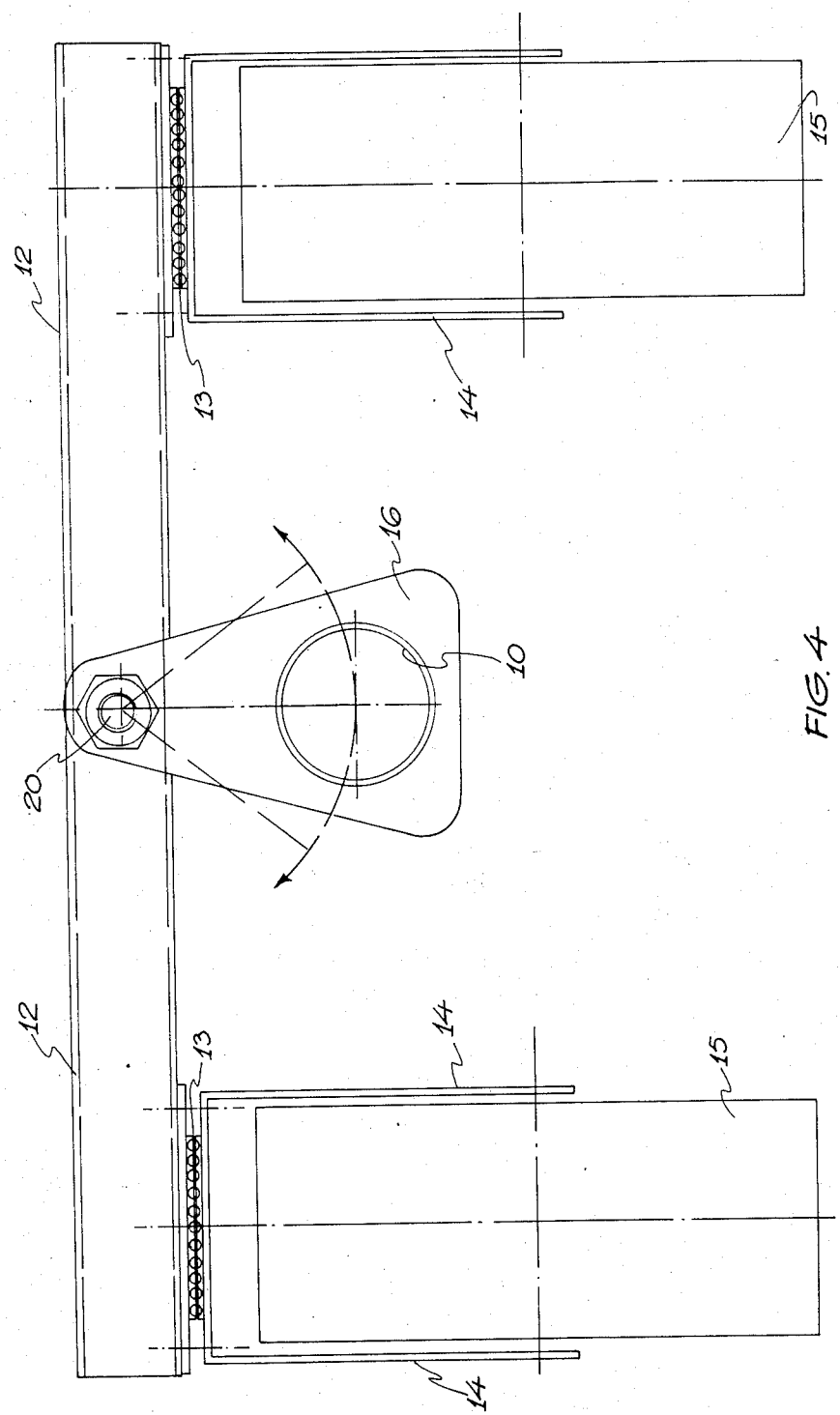
FIG. 4 is an end view of a wheeled carriage.

Referring to FIGS. 2 and 4 of the drawings there is illustrated the first wheeled carriage 8 of the pipe train. The wheeled carriage consists of an elongate frame member 12 having mounted thereon at each end through a respective ball race 13 a pair of plate members 14 which carry ground engaging wheels 15. The races 13 permit independent swivelling of each wheel 15 about a substantially vertical axis. The frame member 12 also has pivotally mounted thereunder by a swivel bolt 20 a pair of pipe supports 16 which in use support a pipe section 10. The swivel bolt 20 permits free pivotal movement of the supports 16, and hence the pipe section 10, about a substantially horizontal axis transverse a notional line joining the swivel axes of the wheels 15, the pipe section 10 passing between the wheels 15 parallel to the pivotal axis of the supports 16. On the top of the frame member there is provided bolt connection means 17 which in this instance is used to pivotally connect a hitch bar 18 which connects to the rear of the machine 1. In order to facilitate engagement of the hitch bar 18 on the frame member 12 nylon washers 19 are provided. The end 21 of the pipe section 10 has a flexible pipe section 22 which is connected to the hose 7 of the machine 1. It will be noted that the centre of gravity of each of the pipe supports is below the top of and between the wheels 15 of the carriage and is therefore correctly placed to facilitate the safe actuation by the carriage of the various movements of the trailed pipe train.

Figure 3:
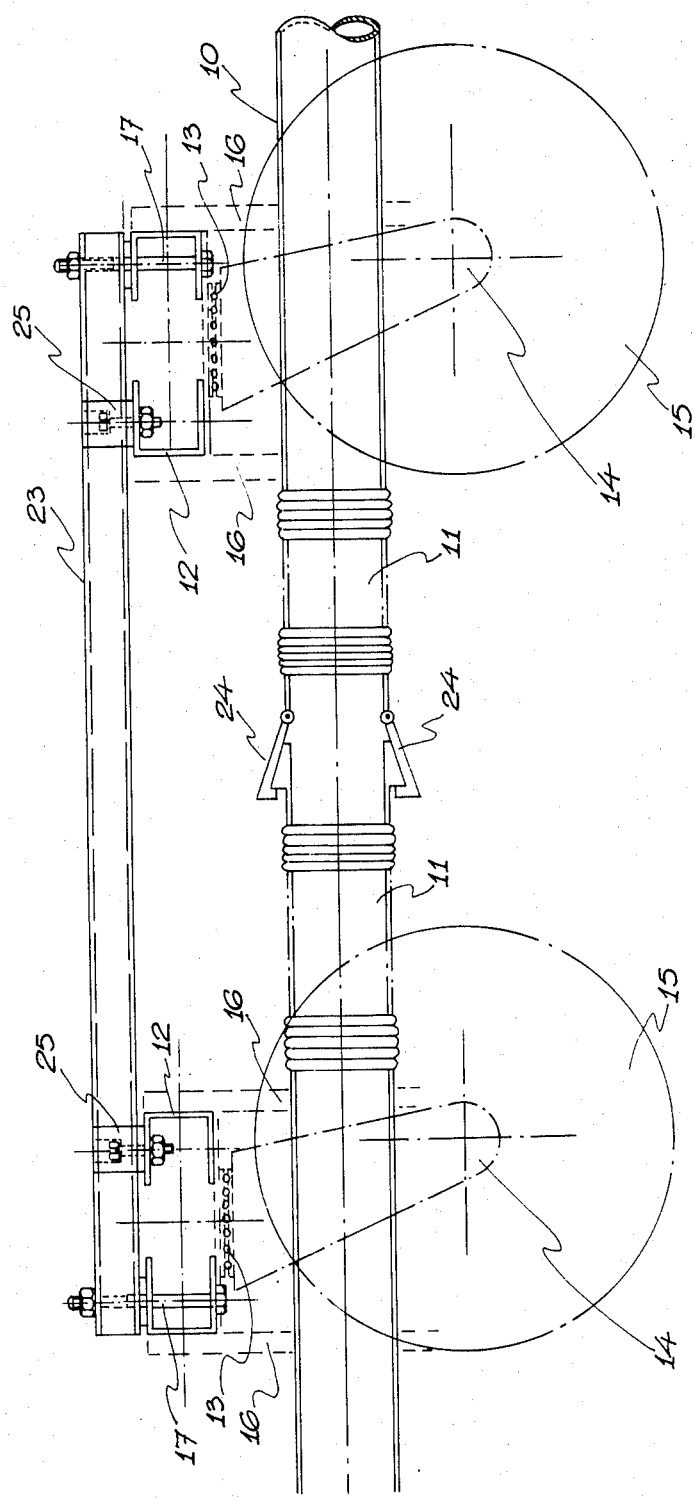
FIG. 3 is a detailed sectional view of two wheeled carriages according to the present invention in use as a connected pair of wheeled carriages in the pipe train.

FIG. 3 of the accompanying drawings shows two wheeled carriages connected as a pair 9 for support and transportation of the connected pipe sections 10. In this construction of a pair of connected wheeled carriages each carriage is of the same basic construction described above, except that each pivot point 17 is offset towards that longitudinal edge of the frame member 12 remote from the frame member 12 of the other carriage. The carriages are connected together by a pivotal link bar 23 connected at 17 centrally to each of the two elongate frame members 12 for rotation about a substantially vertical axis. The link bar 23 while holding the two wheeled carriages together as a pair allows a predetermined controlled relative angular movement between the two wheeled carriages.

The pipe sections 10 are connected together between each pair of wheeled carriages by a flexible pipe section 11 having a conventional snap-on quick release hose connector 24 which is operated in known manner to connect/disconnect the pipe sections 10.

Figure 5:
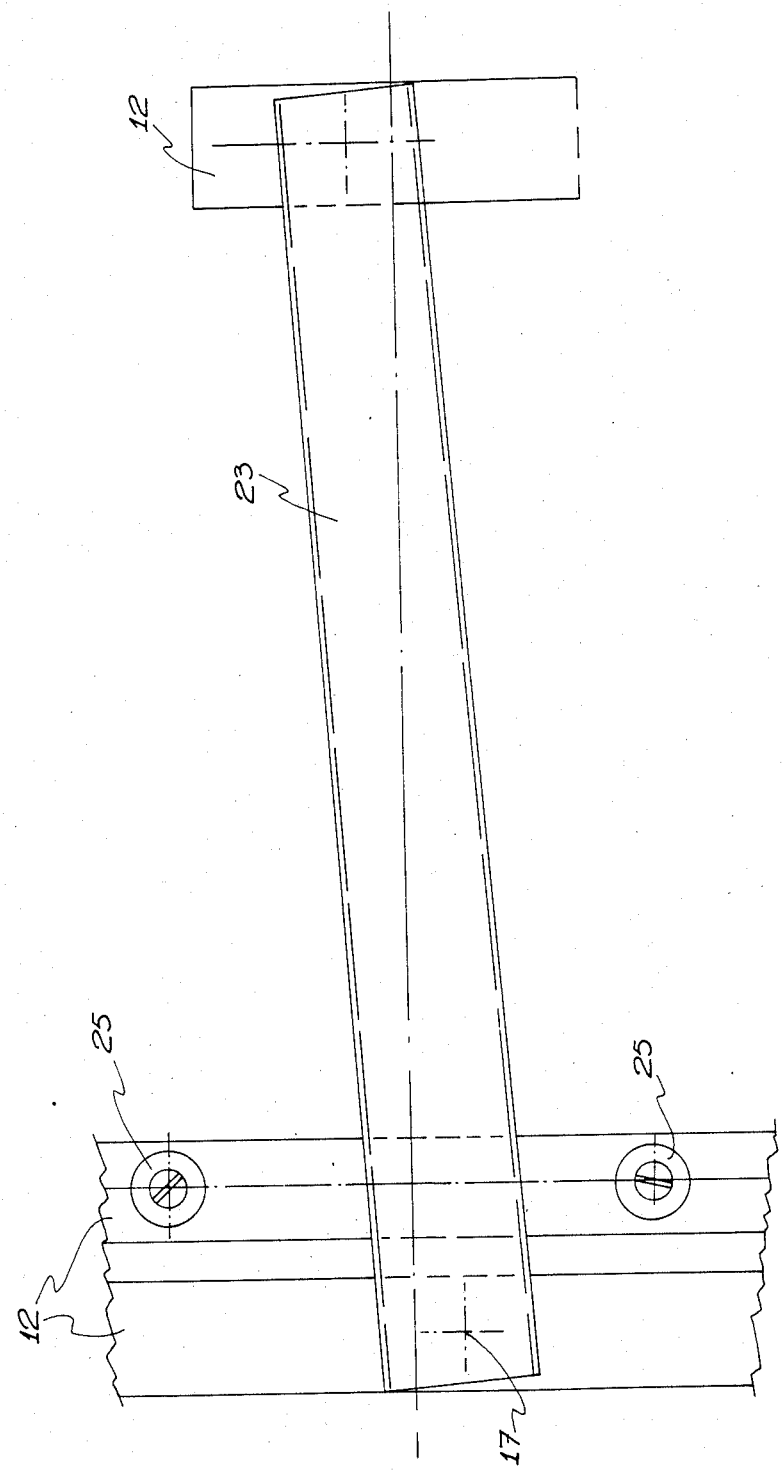
FIG. 5 is a diagrammatic view illustrating the use of the link bar connecting two wheeled carriages.
Figure 6:
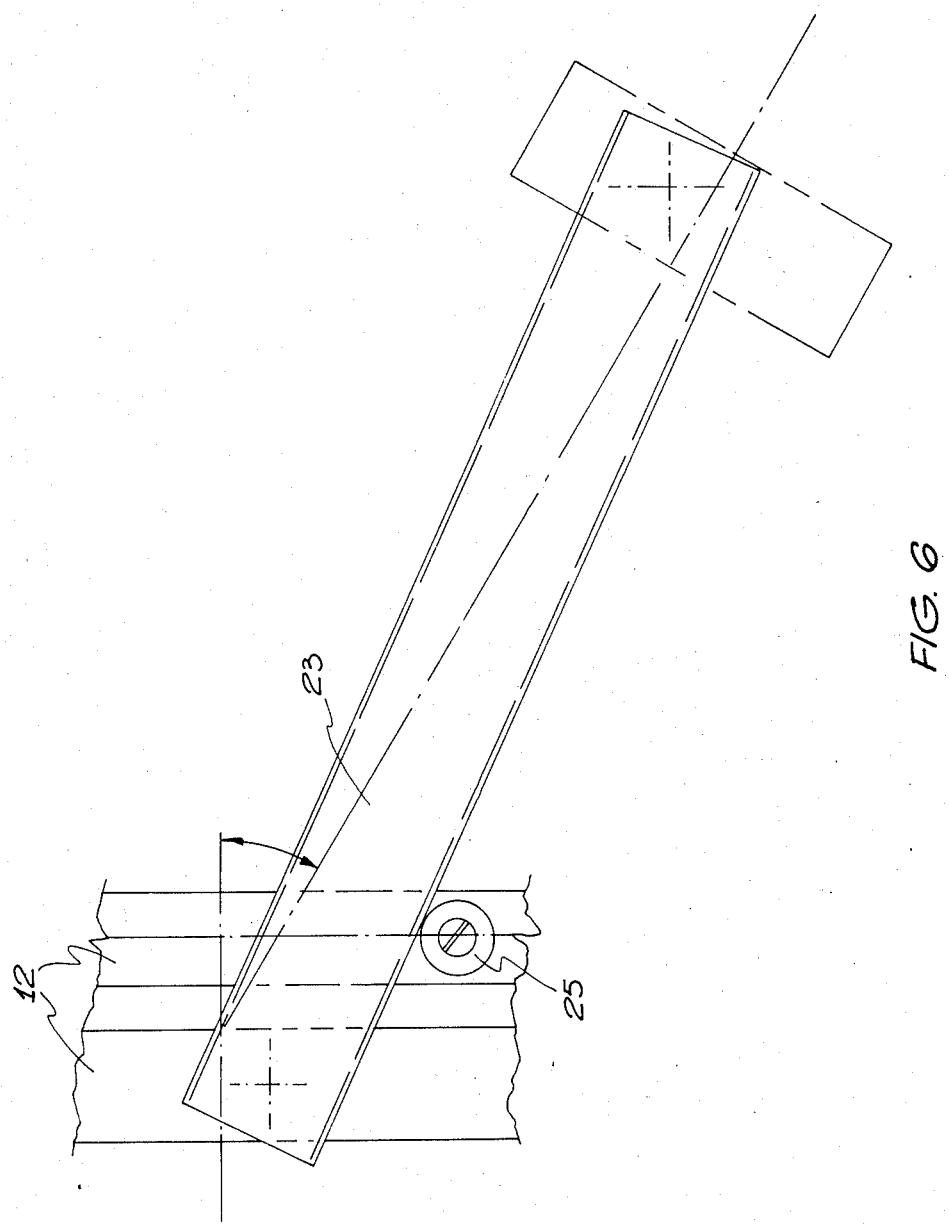
FIG. 6 is a second diagrammatic view illustrating the use of the link bar connecting two wheeled carriages.

Referring to FIGS. 5 and 6 of the accompanying drawings the operation of the link bar 17 is illustrated. In FIG. 5 the link bar 17 is shown in a standard trailing position connected between the frame members 12 of two wheeled carriages. If the machine is reversed the pushed back carriages will assume a zig-zag formation with the two wheeled carriages of a co-operating pair of wheeled carriages adopting the maximum possible angular position relative to each other consistent with proper operation of the machine and trailed pipe train. In order to control the angular movement of the link bar 17 two spaced apart limit stops 25 are provided on the frame member 12 of each wheeled carriage. When the link bar 17 engages a limit stop 25 no further relative angular displacement between the connected wheeled carriages is possible.

It will be readily appreciated that due to the simple construction of the constituent component parts it is relatively easy to assemble and disassemble a pipe train according to the present invention. Further the operation of the pipe train as a trailed support and transportation means for the pipe system is flexible and safe and allows the machine operator to turn and/or reverse the machine without worrying about the position of the pipe train in relation to the machine—since the pipe train may bend, swivel or adopt a zig-zag formation it is a highly manoeuverable train. Also the pipe train may have a considerable length—say 100 meters—since the weight of water in the pipe train is supported on wheeled carriages and since no damage to the ground will consequently occur.

The present invention, including both the wheeled carriage and the pipe train, while described primarily in relation to a pipe train for use with a water collecting machine, clearly has many and varied uses for distribution of fluids. It may for example be used for distributing fertilizer, or used to discharge waste or toxic liquids collected by a machine in a confined yard or shed area.

I claim:

1. A wheeled carriage comprising:
an elongated horizontal frame member,
two independently swivelling ground-engaging wheels,
swivel mounting means for mounting said wheels below the frame member at longitudinally spaced positions along said frame member for wheel rotation about horizontal axes and independent swivelling about vertical swivel axes,
at least one pipe support member freely suspended from the frame member at a position between said wheels for pivoting about a substantially horizontal axis perpendicular to the swivel axes of the wheels,
the pipe support member being adapted to support a pipe below and substantially parallel to said pivot axis of said support member with said wheels being disposed laterally one on either side of said pipe, and
a link bar pivotally connected to the frame member for rotation about a substantially vertical axis to permit the carriage to be coupled to a like carriage to form a connected pair.

2. A wheeled carriage according to claim 1, further including stop members on the frame member to limit the angular movement of the link bar and thereby the angular displacement of the wheeled carriage relative to a like carriage when forming a connected pair with the latter.

3. A pipe train comprising a series of pipe sections, each supported at each end by a respective carriage according to claim 1 or 2, the pair of carriages at each adjacent pair of ends of said rigid pipe sections being connected together by said pivotal link bar bridging the frame members of the carriages and being pivotally connected at the ends of said link bar, respectively to said carriages, each adjacent pair of ends of said rigid pipe sections being flexibly connected together between the respective pair of carriages supporting them.

* * * * *